United States Patent
Jang et al.

(10) Patent No.: US 9,503,563 B2
(45) Date of Patent: Nov. 22, 2016

(54) SMART BAND AND EMERGENCY STATE MONITORING METHOD USING THE SAME

(71) Applicant: LG Electronics Inc., Seoul (KR)

(72) Inventors: Yujune Jang, Seoul (KR); Jeongyoon Rhee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 8 days.

(21) Appl. No.: 14/717,599

(22) Filed: May 20, 2015

(65) Prior Publication Data

US 2015/0348389 A1 Dec. 3, 2015

(30) Foreign Application Priority Data

May 27, 2014 (KR) .......................... 10-2014-0063926

(51) Int. Cl.
| | |
|---|---|
| G08B 21/02 | (2006.01) |
| H04B 1/3827 | (2015.01) |
| H04M 1/725 | (2006.01) |
| H04W 4/22 | (2009.01) |
| G08B 25/01 | (2006.01) |
| G08B 21/04 | (2006.01) |
| G08B 25/00 | (2006.01) |

(52) U.S. Cl.
CPC ........ *H04M 1/72538* (2013.01); *G08B 25/016* (2013.01); *H04B 1/385* (2013.01); *H04M 1/7253* (2013.01); *H04W 4/22* (2013.01); *G08B 21/0446* (2013.01); *G08B 21/0453* (2013.01); *G08B 25/001* (2013.01); *G08B 25/009* (2013.01)

(58) Field of Classification Search
CPC ......... H04M 1/72538; H04M 1/7253; H04M 1/72536; G08B 25/016; G08B 25/001; G08B 21/0446; G08B 25/009; G08B 21/0453; H04B 1/385; H04W 4/22
See application file for complete search history.

(56) References Cited

U.S. PATENT DOCUMENTS

| | | | | |
|---|---|---|---|---|
| 5,196,825 A | * | 3/1993 | Young ................ | G08B 13/1427 340/539.11 |
| 6,310,539 B1 | * | 10/2001 | Rye ...................... | G08B 25/016 340/321 |
| 2012/0194976 A1 | | 8/2012 | Golko et al. | |
| 2014/0370838 A1 | | 12/2014 | Kim et al. | |

FOREIGN PATENT DOCUMENTS

| | | |
|---|---|---|
| JP | 2007-189363 A | 7/2007 |
| KR | 10-2011-0004706 A | 1/2011 |
| KR | 10-2013-0086841 A | 8/2013 |
| KR | 10-2014-0039580 A | 4/2014 |

* cited by examiner

*Primary Examiner* — Kashif Siddiqui
*Assistant Examiner* — Minjung Kim
(74) *Attorney, Agent, or Firm* — Birch, Stewart, Kolasch & Birch, LLP

(57) ABSTRACT

A smart band including a display unit provided at a body, and forming a first touch recognition region; a wrist band connected to the body and having a second touch recognition region at one side of the band; and a controller configured to sense a dangerous situation has occurred based on touch inputs on the first and second touch recognition regions, and transmit preset information to a remote guardian's mobile terminal, in response to the dangerous situation being sensed.

20 Claims, 15 Drawing Sheets

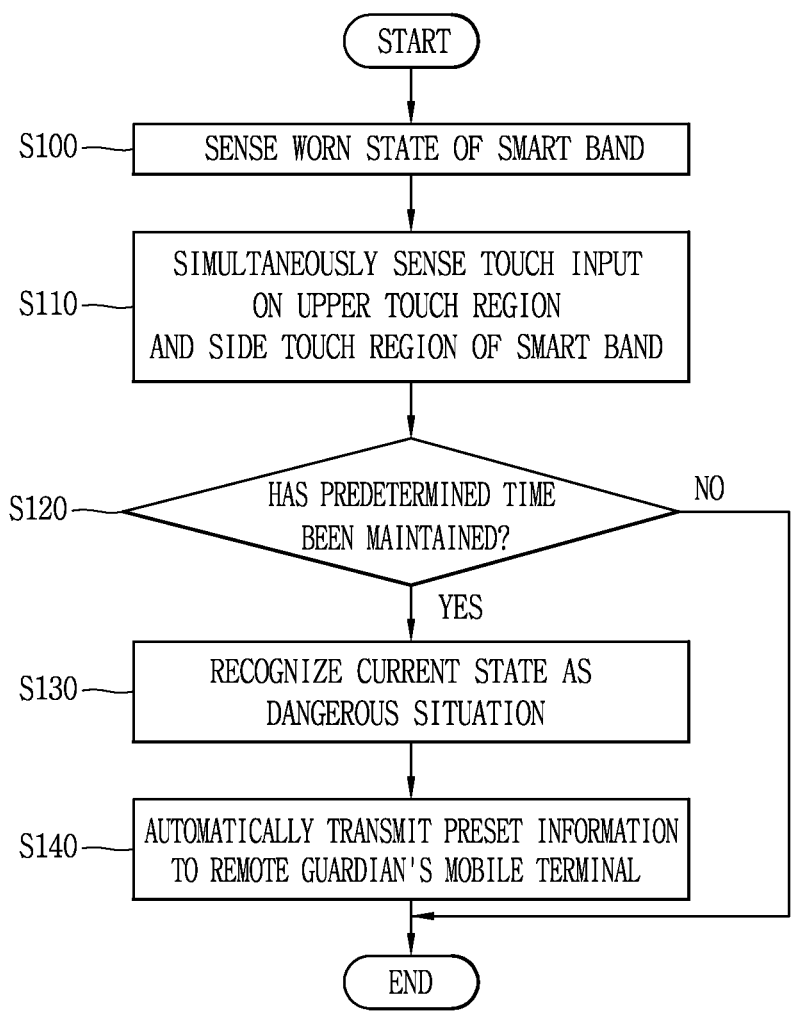

FIG. 13
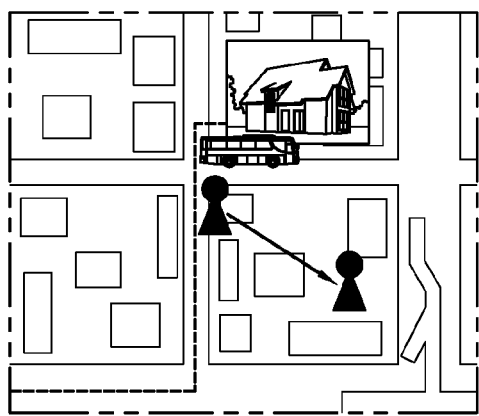
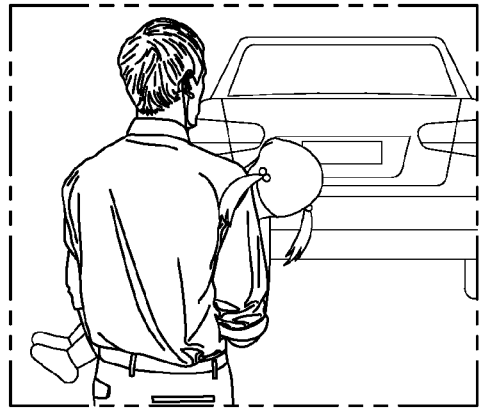
SENSE DRASTIC CHANGE OF SPEED
AND PATH DEVIATION
NOTIFY
DANGEROUS
SITUATION
→
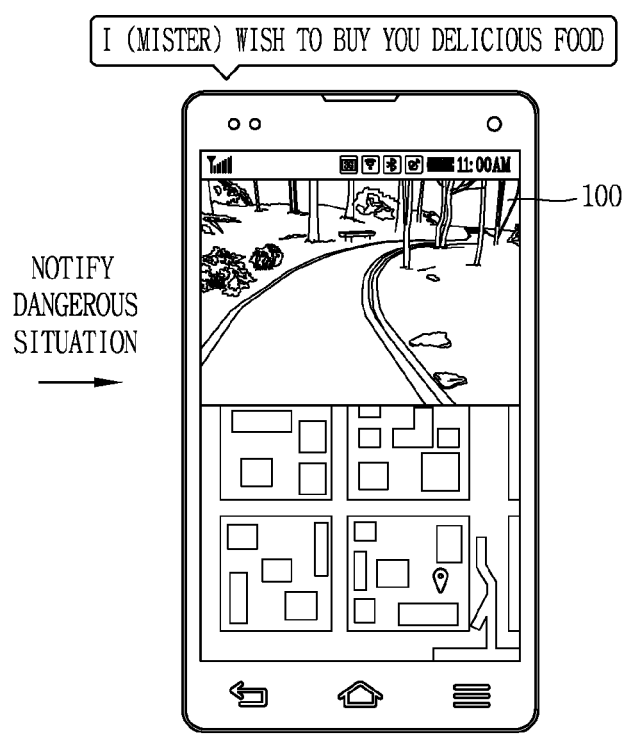

SMART BAND AND EMERGENCY STATE MONITORING METHOD USING THE SAME

CROSS-REFERENCE TO RELATED APPLICATION

Pursuant to 35 U.S.C. §119(a), this application claims the benefit of earlier filing date and right of priority to Korean Application No. 10-2014-0063926, filed on May 27, 2014, the contents of which is incorporated by reference herein in its entirety.

BACKGROUND OF THE INVENTION

1. Field of the Invention

The present invention relates to a smart band capable of effectively monitoring a child's safety at a remote place, and an emergency state monitoring method using the same.

2. Background of the Invention

Terminals may be generally classified as mobile/portable terminals or stationary terminals. Mobile terminals may also be classified as handheld terminals or vehicle mounted terminals. Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Generally, a smart band indicates an electronic device used in a wound state on a user's wrist. The related art smart band has been used to measure a user's exercise amount or calories, with a watch function and a health care function (e.g., a pedometer and a calories calculation function).

Thereafter, products having various designs and performances have emerged owing to expansion of smart band markets. A representative of the products is a smart watch. The smart watch may interwork with an external device and may perform a phone function and communication network connection, with various sensors and communication functions. However, the smart band has been manufactured from only some companies. Further, the smart band has been developed with focusing on appearance or design. That is, various functions and UIs related to the smart band have not been actively developed.

SUMMARY OF THE INVENTION

Therefore, an aspect of the detailed description is to provide a smart band capable of effectively monitoring a child's safety at a remote place, and an emergency state monitoring method using the same.

Another aspect of the detailed description is to provide a smart band capable of conveniently monitoring various dangerous situations, and an emergency state monitoring method using the same.

To achieve these and other advantages and in accordance with the purpose of this specification, as embodied and broadly described herein, there is provided a smart band, including: a display unit provided at a body, and forming a first touch recognition region; a band connected to the body, worn on a user's wrist, and having a second touch recognition region at one side; and a controller configured to real time transmit preset information to a remote guardian's mobile terminal, by being immediately connected to the remote guardian's mobile terminal when a dangerous situation is sensed through the first and second touch recognition regions.

In an embodiment, the dangerous situation may include a situation where the first and second touch recognition regions are simultaneously touched, and the touched state is maintained for a predetermined time.

In an embodiment, the one side may include two surfaces or a lower surface of the smart band.

In an embodiment, information indicating the dangerous situation may be preset, and the preset information may include at least one of a peripheral sound, a peripheral image, a band wearer's position information, and a band wearer's bio-information.

In an embodiment, the dangerous situation may further include a situation where a user's wrist is moved up and down or right and left within more than a predetermined range in a standby state, or a situation where the smart band is separated from a user's wrist in a standby state.

To achieve these and other advantages and in accordance with the purpose of this specification, as embodied and broadly described herein, there is also provided an emergency state monitoring method using a smart band, including: sensing that a body is worn on a user's wrist, by a smart band; performing a related operation according to a touch input sensed, in a standby state, on a first touch recognition region disposed on an upper surface of the body; and if an emergency situation is sensed, in a standby state, through the first touch recognition region and through a second touch recognition region provided on a side surface of the smart band, immediately connecting the smart band to a remote guardian's mobile terminal, and real time-transmitting preset information to the remote guardian's mobile terminal.

In an embodiment, the dangerous situation may include a situation where the first and second touch recognition regions are simultaneously touched, and the touched state is maintained for a predetermined time.

In an embodiment, the one side may include two surfaces or a lower surface of the smart band.

In an embodiment, information indicating the dangerous situation may be preset, and the preset information may include at least one of a peripheral sound, a peripheral image, a band wearer's position information, and a band wearer's bio-information.

In an embodiment, the dangerous situation may further include a situation where a user's wrist is moved up and down or right and left within more than a predetermined range in a standby state, or a situation where the smart band is separated from a user's wrist in a standby state.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments and together with the description serve to explain the principles of the invention.

In the drawings:

FIG. 9 is a flowchart illustrating an emergency state monitoring method using a smart band according to a first embodiment of the present invention;

FIG. 13 is a view illustrating an embodiment to inform an emergency state by a smart band by using a speed and a path of a band wearer;

DETAILED DESCRIPTION OF THE INVENTION

Description will now be given in detail according to embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart glasses), head mounted displays (HMDs), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
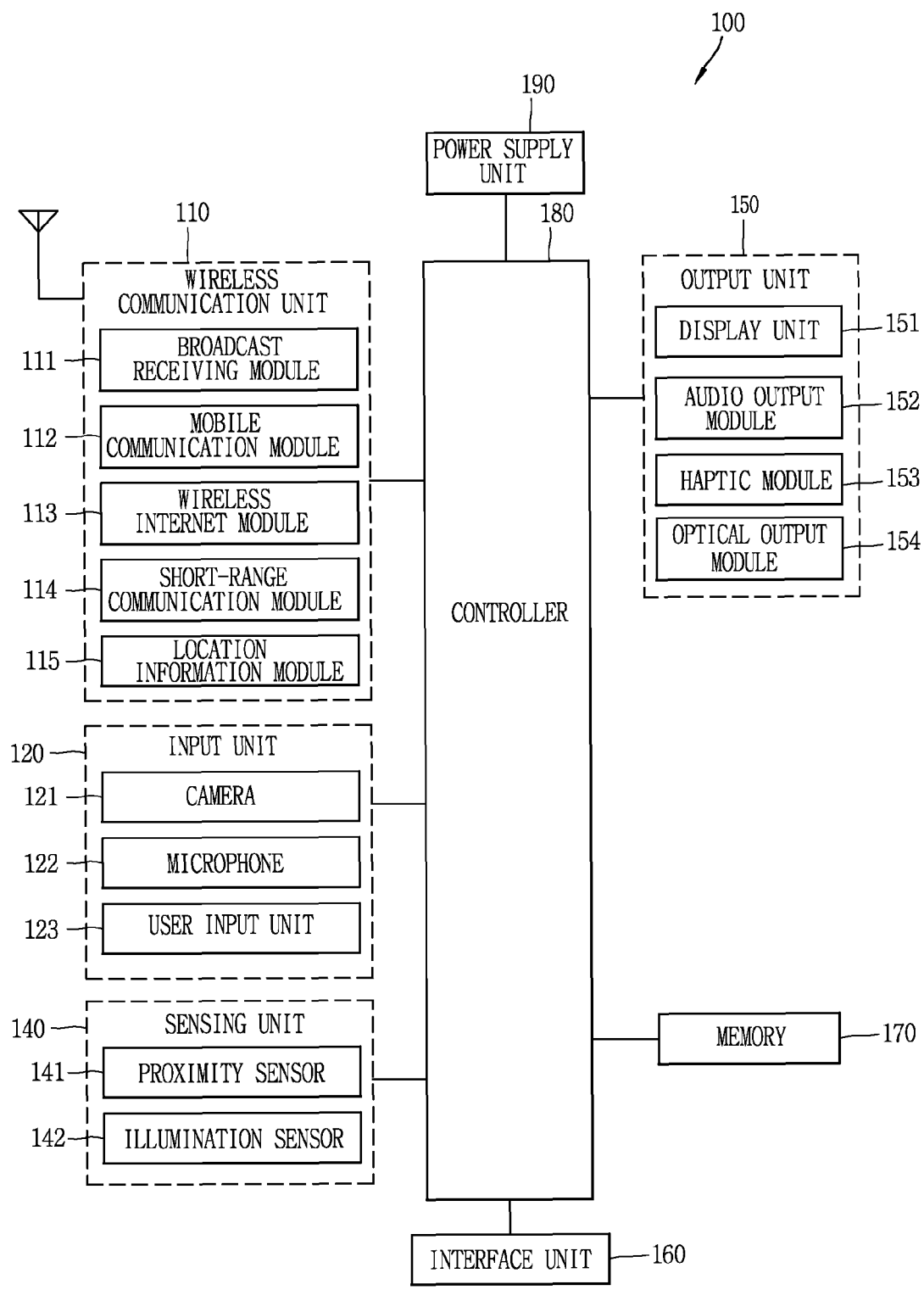
FIG. 1 is a block diagram of a mobile terminal according to an embodiment of the present invention.
Figure 2A:
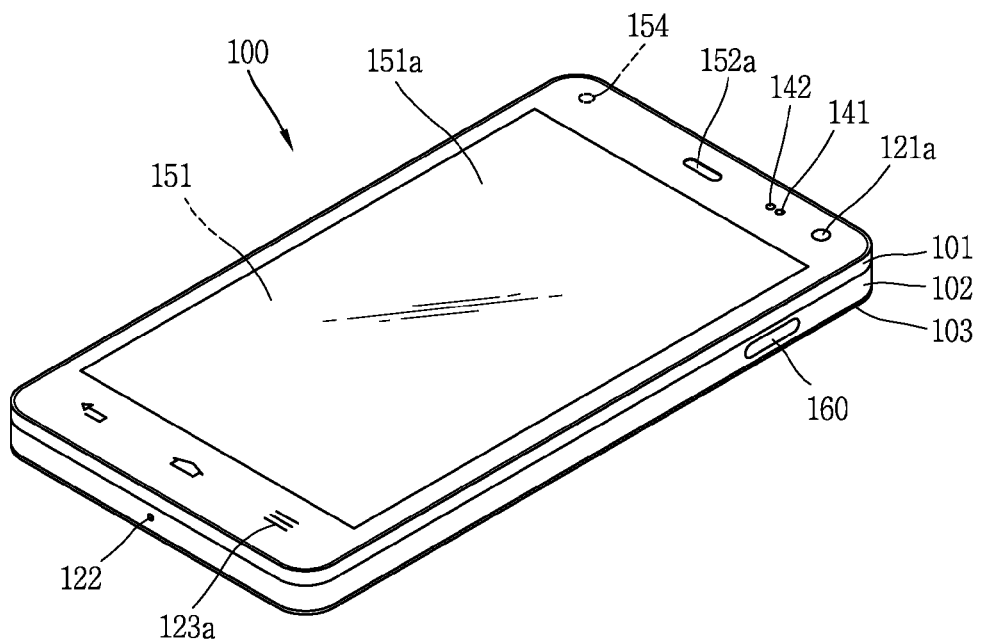
FIGS. 2A and 2B are conceptual views illustrating an example of a mobile terminal according to an embodiment of the present invention, which are viewed from different directions.
Figure 2B:
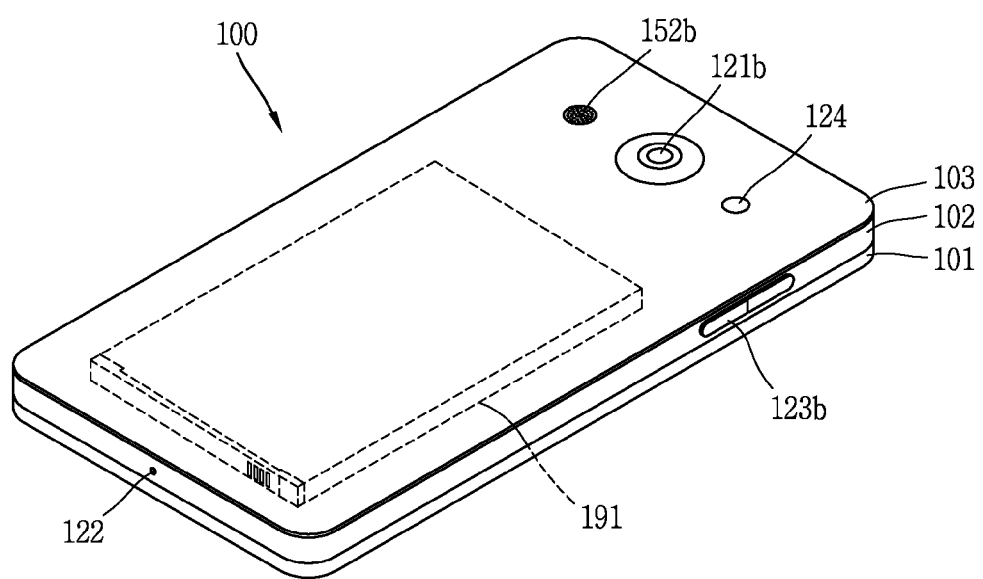

FIG. 1 is a block diagram of a mobile terminal according to an embodiment of the present invention. FIGS. 2A and 2B are conceptual views illustrating an example of a mobile terminal according to an embodiment of the present invention, which are viewed from different directions. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components of FIG. 1 is not a requirement, and that greater or fewer components may alternatively be implemented.

Referring now to FIG. 1, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Hereinafter, the above components will be explained in more detail with reference to FIG. 1, before various embodiments implemented by the mobile terminal 100 are explained. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages. The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example. The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information. In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like. The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition. The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging. The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 2A and 2B, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 2A and 2B depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof. The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display. The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like. The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170. The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 2A illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject. As shown, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1) may be retractable into the terminal body. Alternatively, an antenna may be formed using a film attached to an inner surface of the rear cover 103, or a case that includes a conductive material.

A power supply unit 190 (refer to FIG. 1) for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

A communication system which is operable with the variously described mobile terminal 100 will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1 is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The present invention provides a method for automatically reporting to a police station, etc., by monitoring a peripheral situation of a child who is wearing a smart band, when data transmitted from the smart band meets an emergency state.

Smart Band

A smart band is a type of wearable device, which may be implemented as a smart watch. When the smart band is worn on a child, it is operated as a kid's band. The smart band may include an elastic band formed of an elastic material such as rubber.

Figure 3:
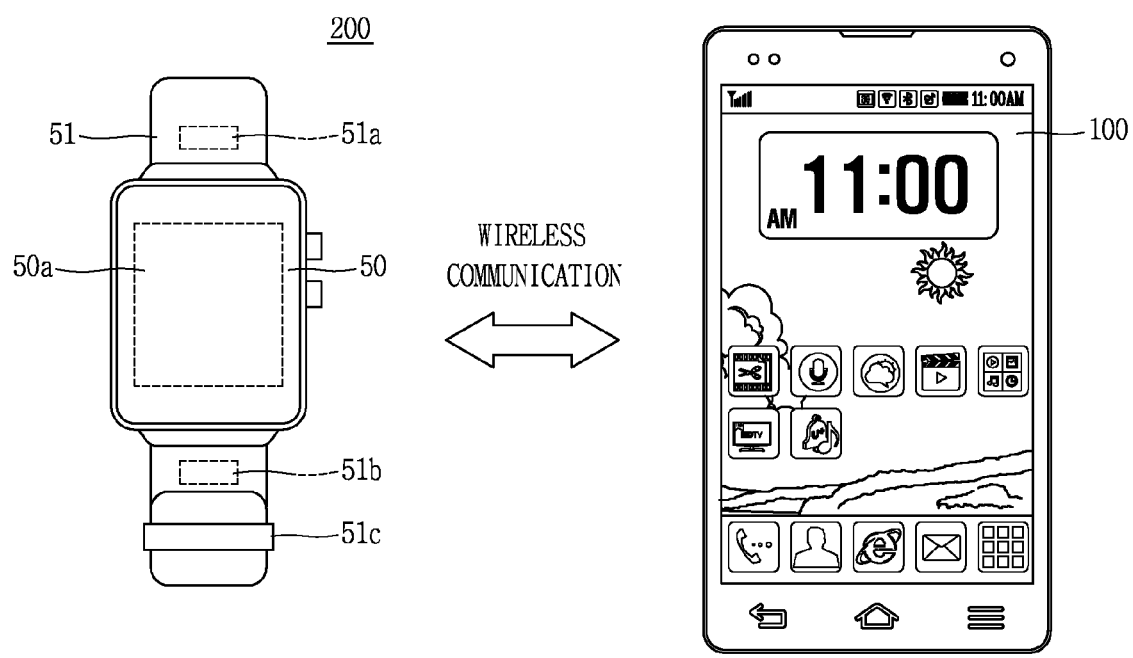
FIG. 3 is a schematic view of a smart band according to an embodiment of the present invention.

FIG. 3 is a schematic view of a smart band according to an embodiment of the present invention. As shown in FIG. 3, the smart band 200 includes a body 50 having an information display region 50a on an upper surface thereof, and a band 51 having one side connected to the body 50 and another side wound on a wrist of a user (e.g., a child, an older and weak person, etc.) to thus be fixed to the wrist through a buckle 51c. Alternatively, the smart band 200 may be implemented as a bracelet having no buckle.

The smart band 200 can perform wireless communication with a mobile terminal, with the various types of elements of the mobile terminal of FIG. 1. In this instance, the information display region 50a may not only display information, but also sense a touch input like the display unit 151 of the mobile terminal. Thus, the information display region 50a may be called an 'upper surface touch region'.

The band 51 may include touch recognition regions 51a, 51b on at least one side. The touch recognition regions 51a, 51b are side touch regions, which are used to sense when a wrist of a band wearer (user) wearing the smart band is intentionally held by another person. The band 51 may be further provided with a pressure sensor for sensing when a large physical force presses the smart band, such as when the user wearing the smart band is intentionally held by another person.

The band 51 may be further provided with at least one information display region. The at least one information display region may be formed as a small plane or line, and may display a call state by flickering on or off or by being displayed brightly when a remote monitor requests for a connection.

A Communication Method According to a Request of a Remote Guardian

Figure 4:
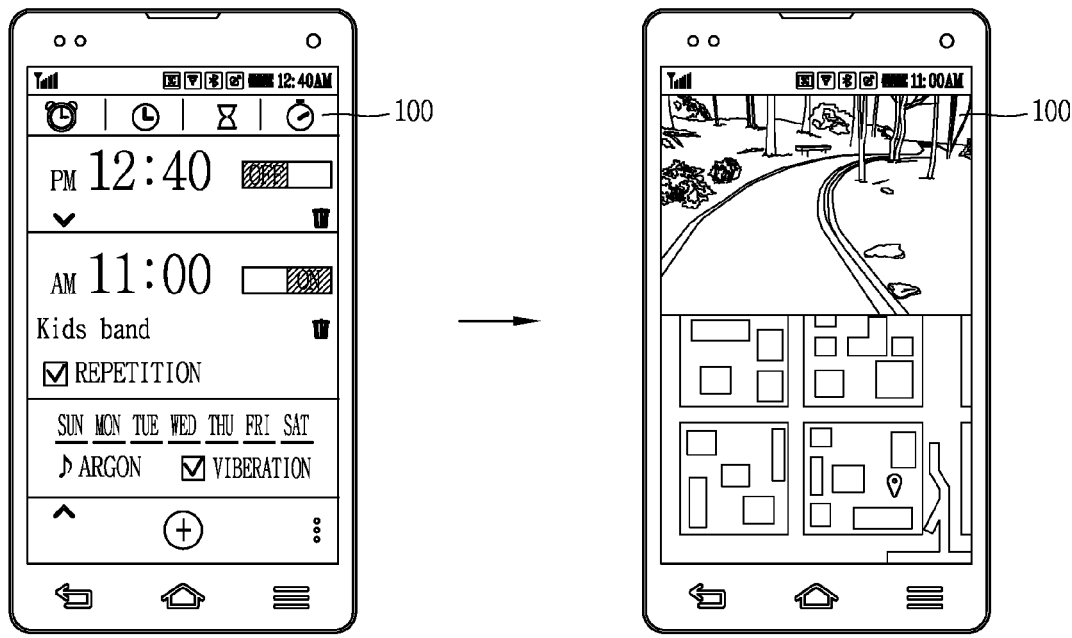
FIGS. 4 and 5 are views illustrating a communication method between a smart band and a mobile terminal according to a request of a remote guardian.
Figure 5:
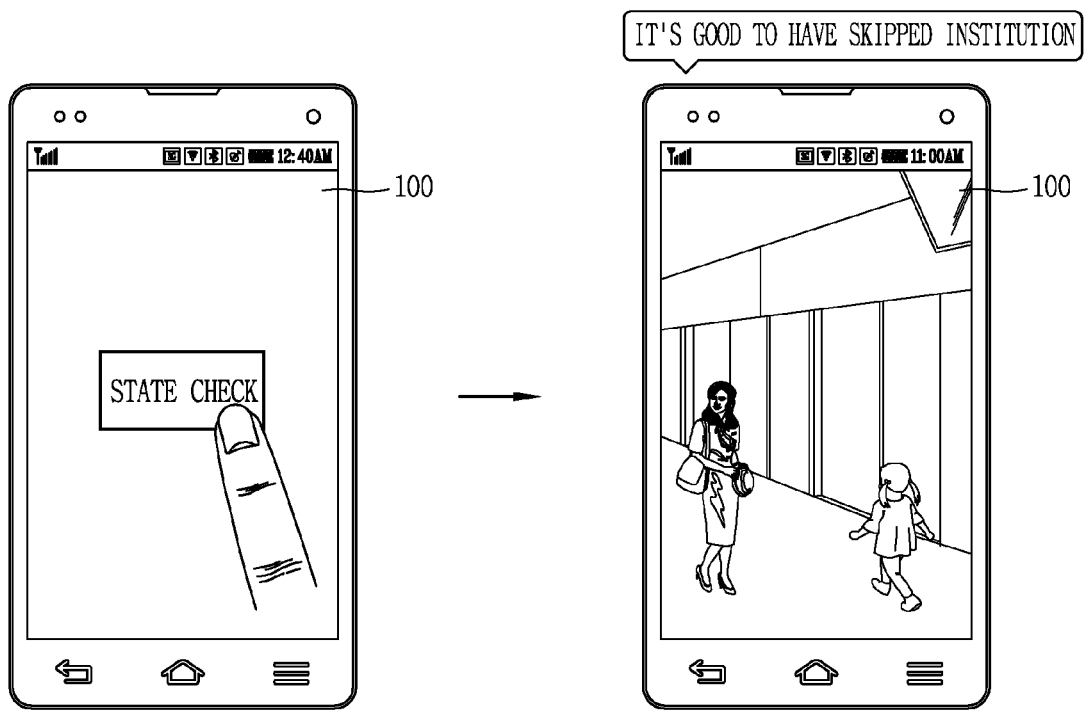

FIGS. 4 and 5 are views illustrating a communication method between a smart band and a mobile terminal according to a request of a remote guardian (remote protector). A remote guardian (a remote monitor, e.g., parents) may monitor the safety of a band wearer (e.g., a child or a user), by being manually or automatically connected to a smart band worn by the band wearer, by using a mobile terminal.

For instance, the remote guardian can remotely monitor his or her child's safety, automatically at a preset time, by setting an alarm to his or her mobile terminal 100. That is, as shown in FIG. 4, the mobile terminal 100 can automatically communicate with the smart band 200 at a preset alarm time (e.g., 11:00 o'clock), thereby outputting a band wearer's state information provided from the smart band 200 through the output unit 150 (e.g., the display unit or the audio output unit). The alarm time is settable on a menu, and may be set at a specific time or within a specific time range.

The band wearer's state information may include not only a band wearer's peripheral situation (environment) captured by the smart band, but also a current position and a peripheral sound. For this, when the mobile terminal 100 transmits a remote control signal to the smart band 200, the remote guardian can determine information to be collected and transmitted by the smart band 200, from a menu. As another embodiment, the remote guardian can remotely monitor a band wearer's state, by being manually connected to the smart band through a menu selection.

As shown in FIG. 5, once the remote guardian selects a 'state check' menu, the mobile terminal 100 transmits, to the smart band 200, a remote control signal requiring measurement of a band wearer's state. If the remote control signal is received from the mobile terminal 100, a controller of the smart band 200 can display notification information on the information display region 50a of the body 50, and on a predetermined region of the band 51, the notification information informing that the remote guardian has requested for measurement of a band wearer's state. As another embodiment, if the remote guardian selects a spy mode from a menu, the controller of the smart band 200 may not display the notification information.

The controller of the smart band 200 records a peripheral sound and a peripheral image, by selectively operating a microphone, a camera, and a position information module (GPS) according to a remotely measuring object included in a remote control signal. Then, the controller of the smart band 200 transmits the recorded peripheral sound and peripheral image, to the mobile terminal of the remote guardian, together with position information. As a result, as shown in FIG. 5, the band wearer's peripheral image and current position are displayed on the mobile terminal of the remote guardian, and the peripheral sound is output to the mobile terminal of the remote guardian in the form of a voice.

A Feedback Method of a Smart Band

Figure 6:
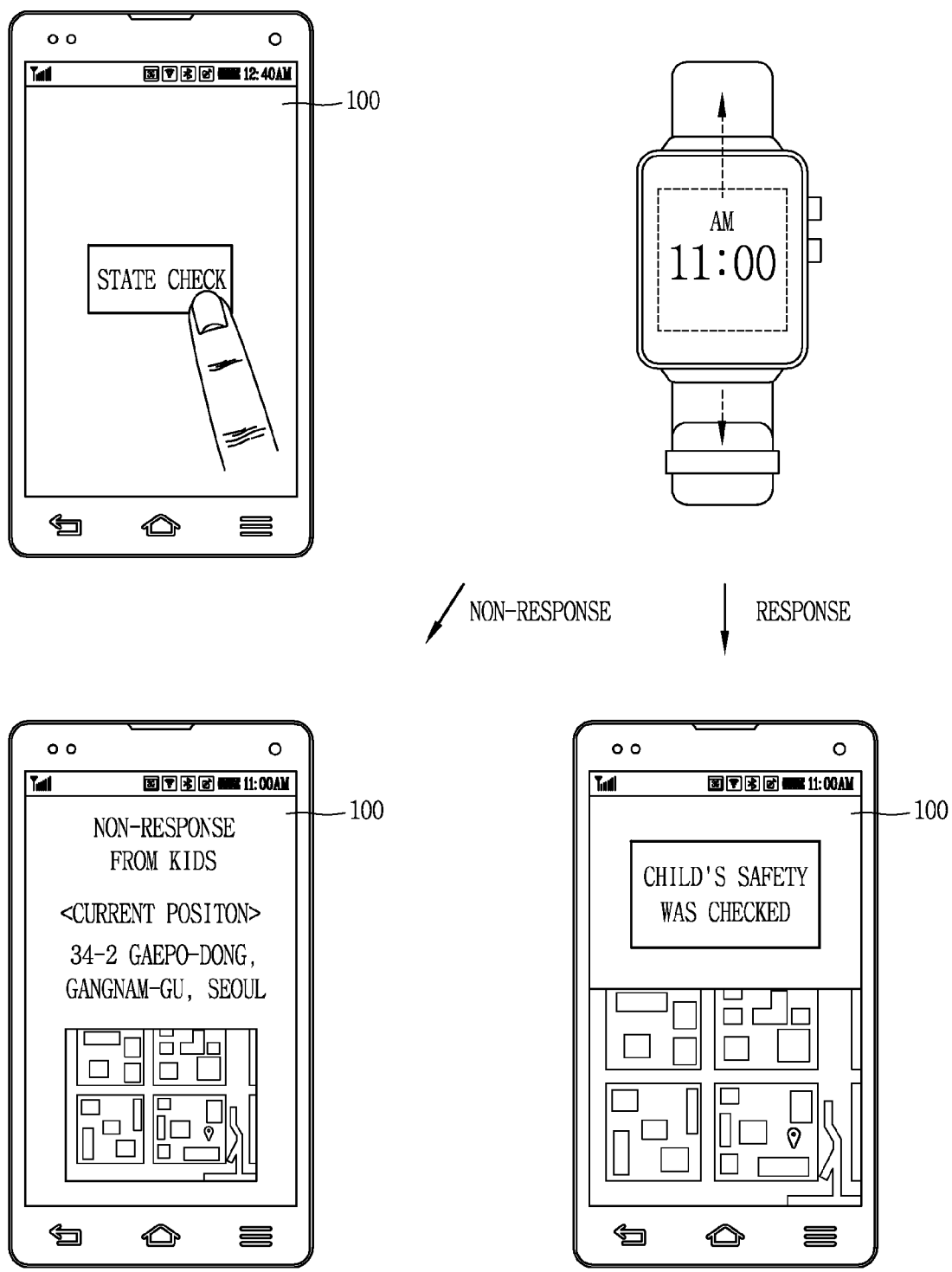
FIG. 6 is a view illustrating a feedback method of a smart band.

FIG. 6 is a view illustrating a feedback method of a smart band. As shown in FIG. 6, once the remote guardian selects a 'state check' menu, the mobile terminal 100 transmits, to the smart band 200, a remote control signal requiring measurement of a band wearer's state. If the remote control signal is received from the mobile terminal 100, the controller of the smart band 200 can display notification information on the information display region 50a of the body 50, and on a predetermined region of the band 51, the notification information informing that the remote guardian has requested for measurement of a band wearer's state. The notification information may be output in one of audible, visible and tactile manners. The audible manner includes a voice message or a sound, and the tactile manner includes a vibration. The notification information may be displayed on at least one of the information display region 50a of the body 50, the touch recognition regions 51a, 51b of the band 51, and a belt 51c of the band 51.

The band wearer may respond to a remote control signal of the remote guardian. As one embodiment, if the reception of a remote control signal is guided in the form of a voice, the band wearer may respond in the form of a voice. As another embodiment, if the reception of a remote control signal is guided in the form of a voice, a vibration or a sound, the band wearer may respond by touching the information display region 50a of the body 50, or by pulling the band 51. In this instance, the controller of the smart band 200 can recognize a "safe" state if an upper end band is pulled, and recognize a "dangerous" state if a lower end band is pulled. As still another embodiment, if the reception of a remote control signal is displayed in the form of a guide (e.g., arrow) at a predetermined region, the band wearer may respond by dragging the guide.

As shown in FIG. 6, the controller of the smart band 200 transmits, to the mobile terminal 100, a signal corresponding to the band wearer's such response together with position information so that the remote guardian can check the band wearer's safety. Further, if there is no response from the band wearer, the controller of the smart band determines a current state as an emergency state. Then, the controller of the smart band transmits a signal indicating no response, together with a current position checked real time, to the mobile terminal 100 of the remote guardian. In this instance, the remote guardian can request for an emergency mobilization (dispatch) by calling a patrol division closest to the band wearer's position.

A Communication Method According to a Request of a Band Wearer

Figure 7:
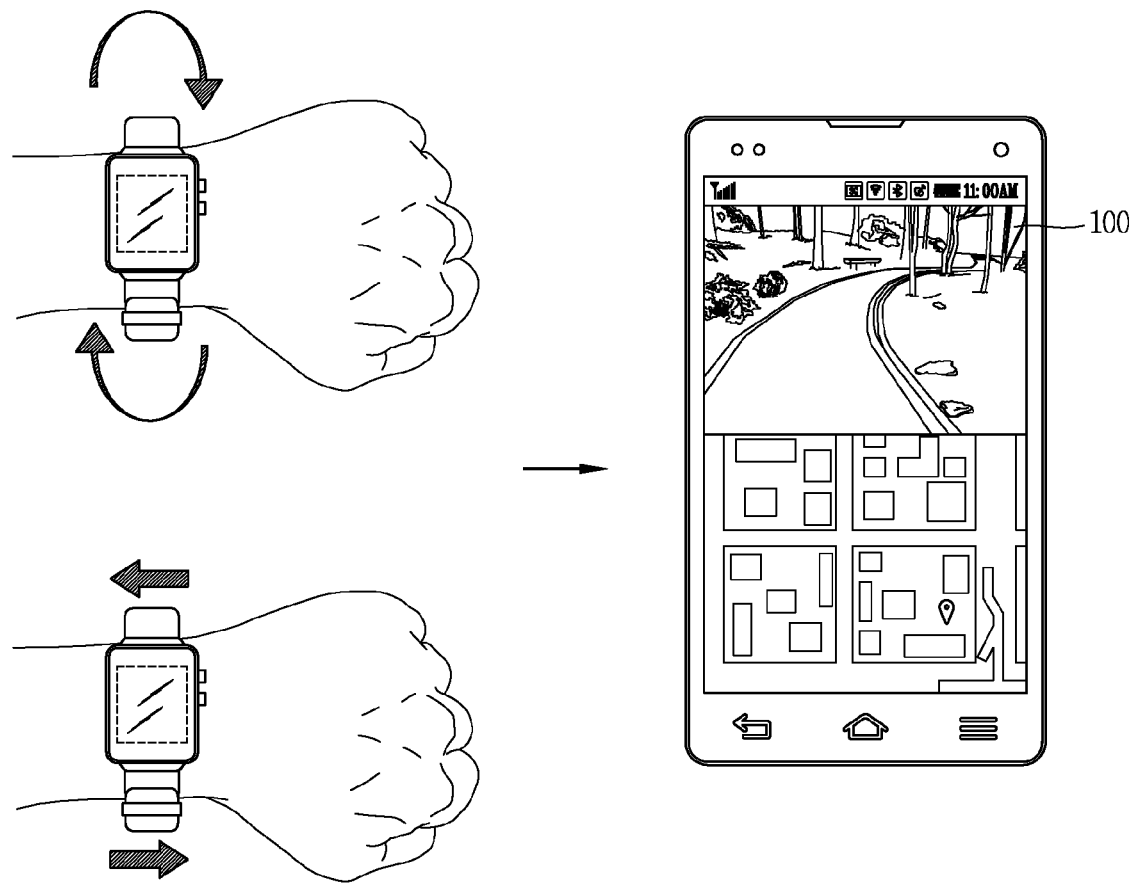
FIG. 7 is a view illustrating an embodiment of a communication method between a smart band and a mobile terminal according to a request of a band wearer.

FIG. 7 is a view illustrating an embodiment of a communication method between a smart band and a mobile terminal according to a request of a band wearer. As shown in FIG. 7, if the band wearer performs a preset action, the controller of the smart band urgently performs a connection with the remote guardian. The preset action may be an action to move the band wearer's wrist intentionally up and down or right and left. For instance, if the band wearer is running from someone chasing them, or if the band wearer is kidnapped, the band wearer has a difficulty in calling the remote guardian. In this situation, if the band wearer's wrist is moved, the controller of the smart band performs an automatic connection with the remote guardian's mobile terminal for transmission of preset information. For instance, if the band wearer's wrist is moved back and forth or right and left at a speed more than a predetermined value, the controller of the smart band can automatically operate a camera and a microphone so that preset information (e.g., a peripheral situation such as a sound and an image) and position information can be transmitted to the remote guardian's mobile terminal.

In the above descriptions, communication between the smart band and the mobile terminal has been performed according to a request of the remote guardian or the band wearer. However, the present invention is not limited to this. That is, in an embodiment of the present invention, the smart band can automatically transmit preset information to the remote guardian's mobile terminal by recognizing the band wearer's dangerous state. For this, the smart band may be provided with various types of sensors, e.g., a touch sensor, an acceleration sensor, a pressure sensor, a gravity sensor, a GPS sensor, a sensor for sensing various bio-information, etc.

Generally, since a capacitive touch method recognizes a dielectric substance, whether the smart band has been covered by a hand or not can be recognized by using an information display region where information is displayed by the capacitive touch method. However, it is impossible to evenly cover the information display region 50a of the smart band, even if there is a dielectric material (a metallic material, a water box, etc.) nearby. Thus, it can be determined whether the information display region 50a is merely touched or covered (held) by a hand, based on a touch type.

Figure 8A:
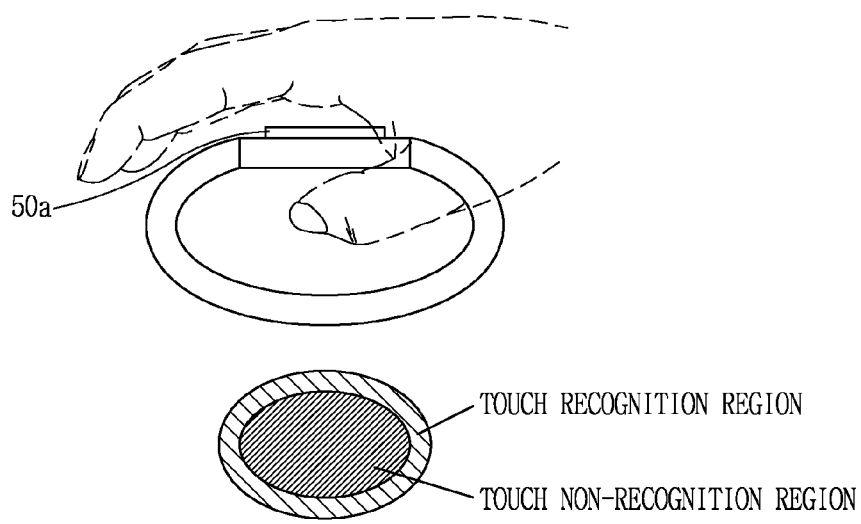
FIGS. 8A to 8C are views illustrating a type of a touch input applied to an information display region.
Figure 8B:
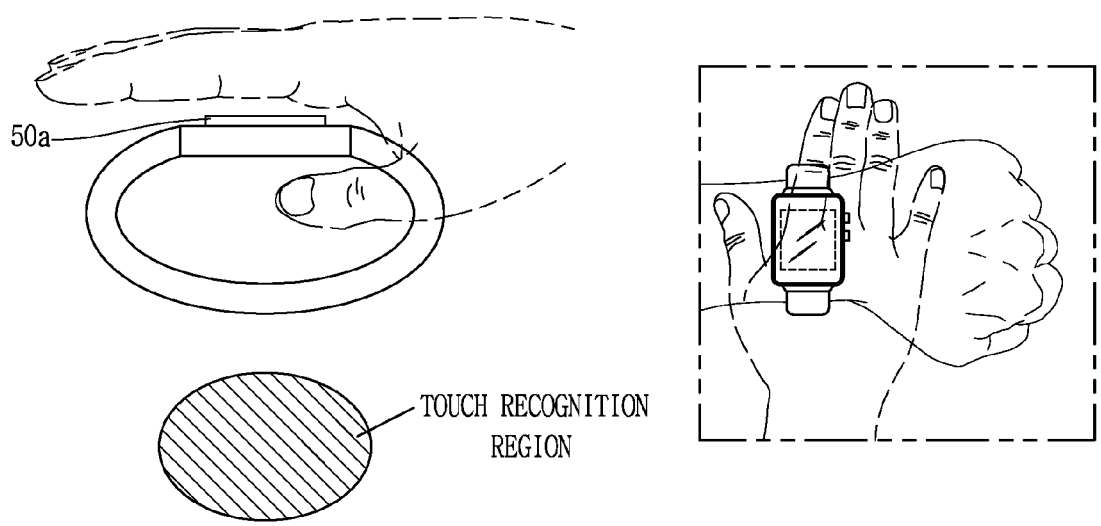
Figure 8C:
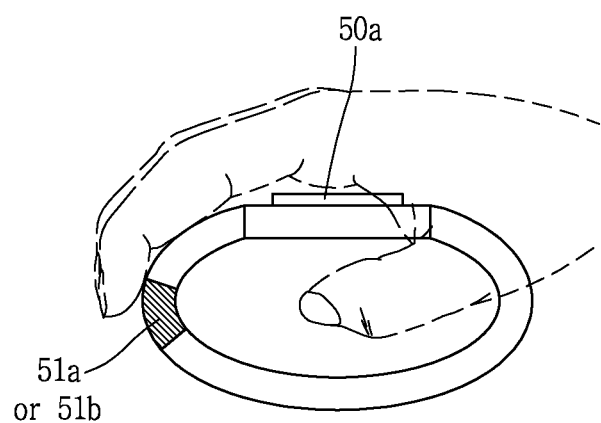

FIGS. 8A to 8C are views illustrating a touch type applied to the information display region 50a. As shown in FIG. 8A, a touch recognition region is formed on one point of the information display region 50a provided on an upper surface of the body 50 when the information display region 50a is partially touched by a finger, and the touch recognition region is formed at an outer side when the touch recognition region is unintentionally covered by a hand. However, as shown in FIG. 8B, a user should straighten his or her hand intentionally so as to cover an entire part of the information display region 50a. Also, as shown in FIG. 8C, the user should intentionally cover an entire part of the smart band.

In an embodiment of the present invention, for recognition of a user's intentional action, a touch recognition region is provided at a buckle or a side surface of the smart band. If the upper touch region 50a of the smart band is simultaneously touched for a predetermined time with the side touch region 51a or 51b or the lower touch region, it is determined that a user has performed an intentional action to cover (hold) the smart band.

An Automatic Communication Method Between a Smart Band and a Mobile Terminal

FIG. 9 is a flowchart illustrating an emergency state monitoring method using a smart band according to a first embodiment of the present invention. As shown in FIG. 9, the controller of the smart band can sense whether the smart band has been worn by a user or not (S100). For instance, if a lower surface of the body 50 of the smart band is adhered to a user's wrist, or if the band 51 is adhered to a user's wrist, the controller recognizes that the smart band has been worn on the user's wrist.

If the upper touch region 50a of the smart band is simultaneously touched with the side touch region 51a or 51b, when the smart band is worn on a user's wrist (S110), the controller checks whether the touched state is maintained for a predetermined time (S120). The reason is to determine if the band wearer's wrist has been held by someone, or if the band wearer has intentionally covered his or her wrist so as to inform a dangerous state. Further, if a touch occurs on the upper touch region 50a or the side touch region 51a or 51b of the smart band, an operation corresponding to the touch is performed.

If it is determined that touch inputs simultaneously applied to the upper touch region 50a and the side touch region 51a or 51b of the smart band have been maintained for a predetermined time, the controller recognizes a current state as an emergency state (S130). Then, the controller transmits preset information to a remote guardian's mobile terminal. The preset information includes at least one of a peripheral sound, a peripheral image and position information (S140). Further, if it is determined that touch inputs simultaneously applied to the upper touch region 50a and the side touch region 51a or 51b of the smart band have not been maintained for a predetermined time, the controller terminates the current operation.

Figure 10:
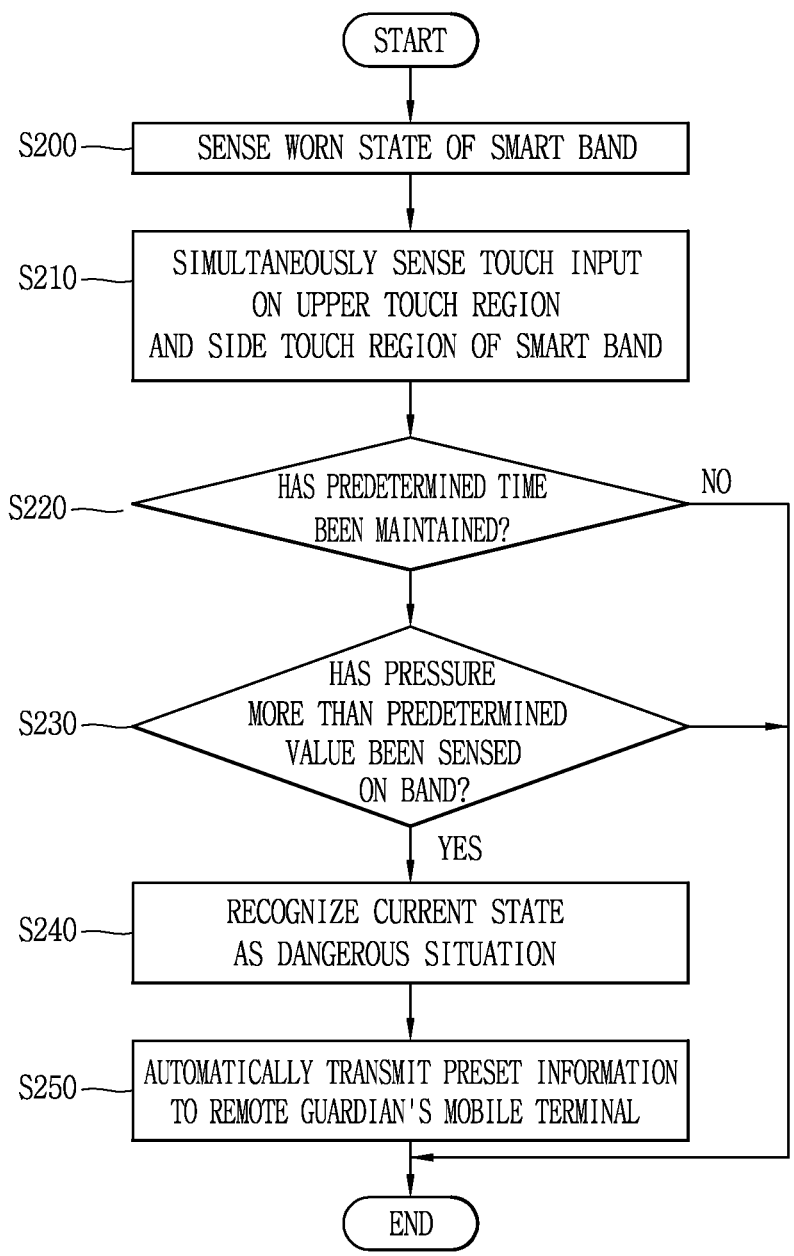
FIG. 10 is a flowchart illustrating an emergency state monitoring method using a smart band according to a second embodiment of the present invention.

Next, FIG. 10 is a flowchart illustrating an emergency state monitoring method using a smart band according to a second embodiment of the present invention. Referring to FIG. 10, the emergency state monitoring method using a smart band according to the second embodiment of the present invention is the same as the emergency state monitoring method using a smart band according to the first embodiment of the present invention, except for S230. That is, when touch inputs simultaneously applied to the upper touch region 50a and the side touch region 51a or 51b of the smart band have been maintained for a predetermined time, the controller recognizes a current state as a dangerous state only when a pressure more than a predetermined value is sensed on the smart band.

Figure 11:
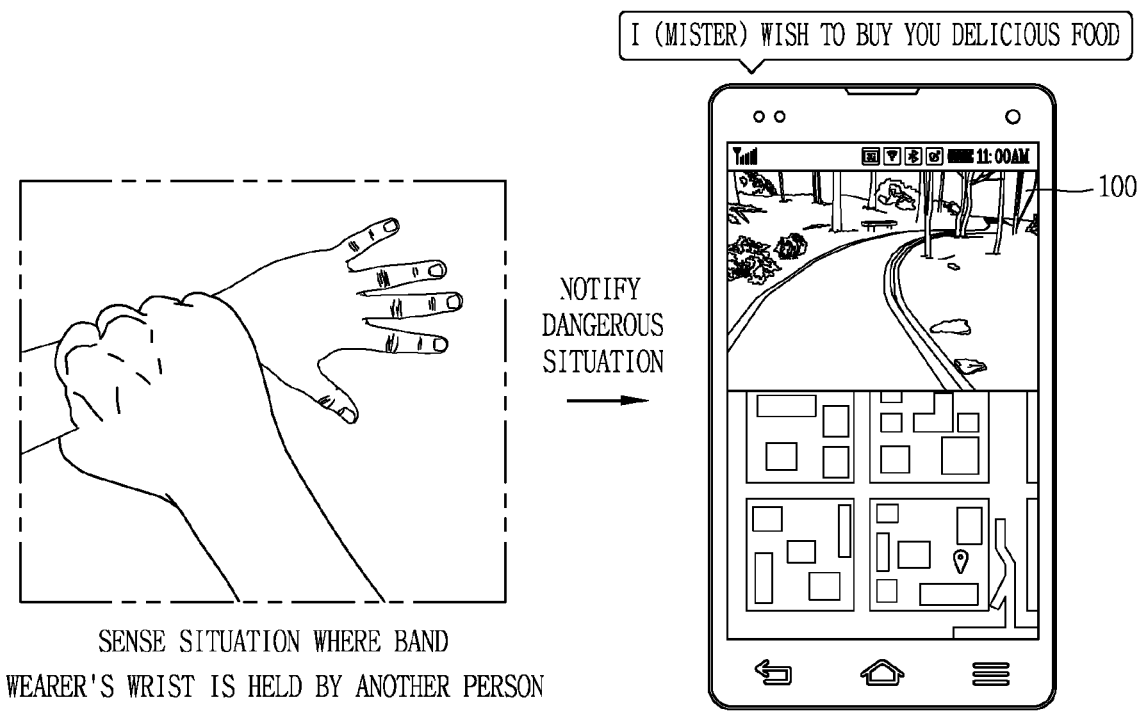
FIG. 11 is a view illustrating an example of an emergency state monitoring method using a smart band according to a first embodiment of the present invention.

FIG. 11 is a view illustrating an example of an emergency state monitoring method using a smart band according to a first embodiment of the present invention. As shown in FIG. 11, if the band wearer's wrist is intentionally held by a third person, touch inputs are simultaneously generated from the upper touch region 50a and the side touch region 51a or 51b of the smart band. If touch inputs simultaneously generated from the upper touch region 50a and the side touch region 51a or 51b of the smart band have been maintained for a predetermined time, the controller recognizes a current state as a dangerous state (emergency state).

If a current state is recognized as a dangerous state, the controller may perform an urgent connection (including a call) with the remote guardian's mobile terminal, thereby real-time transmitting preset information to the remote guardian's mobile terminal. As one embodiment, the controller can transmit a peripheral sound and a peripheral image to the remote guardian's mobile terminal during an urgent call. As another embodiment, the controller can transmit a peripheral sound, a peripheral image, and the band wearer's position information to the remote guardian's mobile terminal during an urgent call. The peripheral sound may be transmitted after being converted into a text.

As still another embodiment, the controller can measure and transmit the band wearer's bio-information (heart rate or body temperature) during an urgent call. For transmission of such information, the controller can operate at least one of a camera, a microphone, a GPS and a bio-information sensor when an emergency state is recognized. If the camera is not smoothly operated, the controller may transmit a CCTV image as a peripheral image by communicating with a peripheral CCTV.

The present invention is not limited to the above embodiments. That is, in the emergency state monitoring method using a smart band according to an embodiment of the present invention, an emergency call may be performed based on a band wearer's bio-information.

Figure 12:
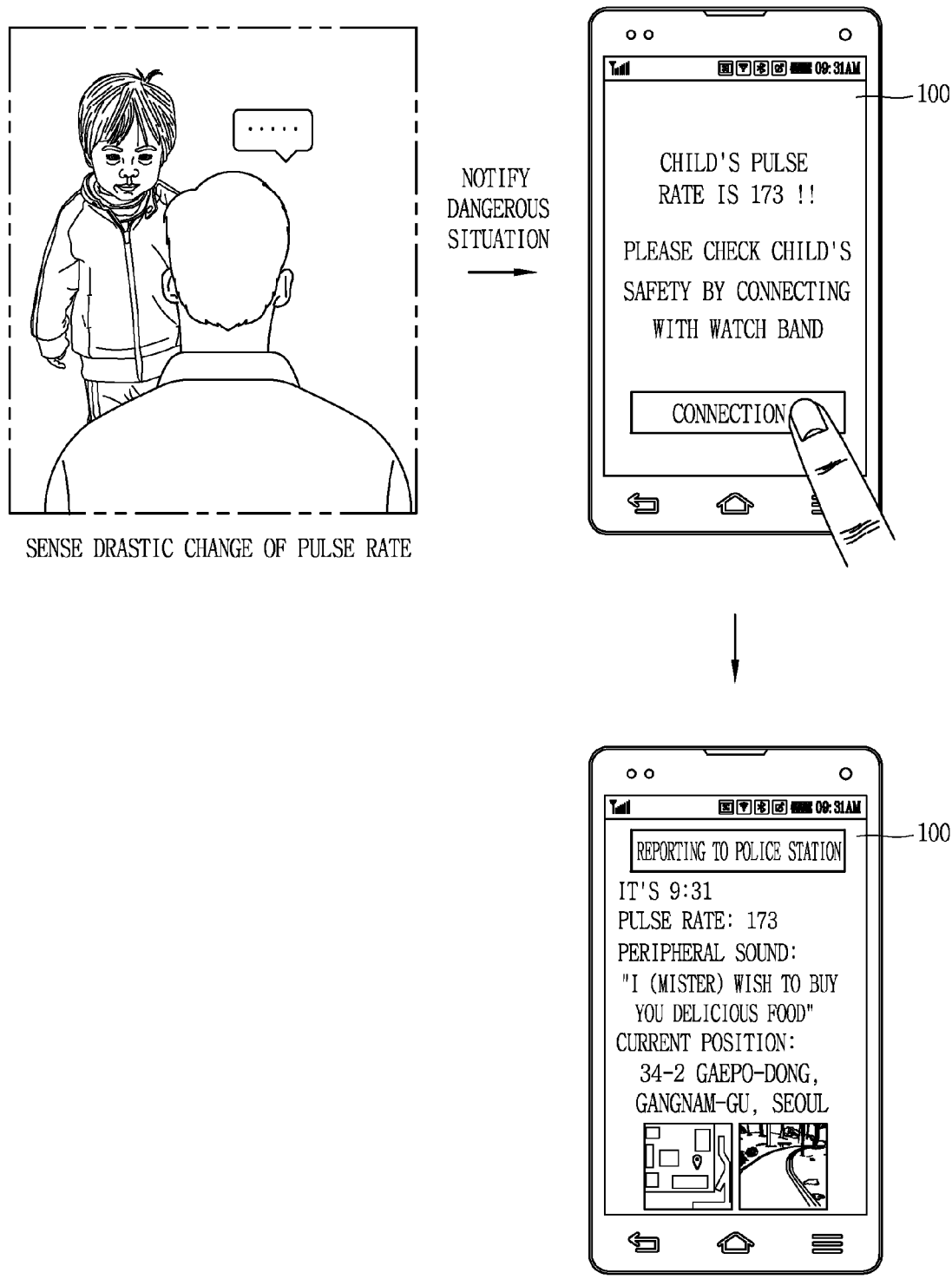
FIG. 12 is a view illustrating an embodiment to inform an emergency state by a smart band by using bio-information.

An Automatic Communication Method Using Other Information Between a Smart Band and a Mobile Terminal FIG. 12 is a view illustrating an embodiment to inform an emergency state by a smart band by using bio-information. Sensors for sensing a band wearer's bio-information (heart rate or body temperature) are attached to the body or a bottom surface of the band. Once a user wears the smart band on his or her wrist, the sensors sense the band wearer's bio-information, and the controller compares the sensed bio-information with pre-stored information and analyzes the sensed bio-information. If a pulse rate (a pulse frequency) more than a usual (average) value is sensed as an analysis result, the controller determines a current state as a dangerous state, and performs an urgent connection with the remote guardian's mobile terminal to thus transmit the measured bio-information to the remote guardian's mobile terminal.

A message for connection with the smart band is displayed on the display unit 151 of the remote guardian's mobile terminal, together with the transmitted band wearer's pulse rate. If the remote guardian selects 'connection' in order to check the band wearer's safety while viewing the message, the controller 180 transmits a remote control signal to the smart band.

The controller of the smart band operates a microphone and a camera according to the received remote control signal, thereby obtaining a peripheral sound and a peripheral image. Then, the controller of the smart band transmits the obtained peripheral sound and peripheral image to the remote guardian's mobile terminal, together with position information. The corresponding information is displayed on the display unit 151. When the received band wearer's information is displayed on the display unit 151, a 'police station report' menu. The remote guardian can select the 'police station report' menu, while viewing the currently-displayed band wearer's information. If the 'police station report' menu is selected, the received band wearer's information is automatically transmitted to a police station.

In the above embodiment, the band wearer's information is transmitted according to a request of the remote guardian when an emergency state is recognized. However, the present invention is not limited to this. That is, when an emergency state is recognized, the band wearer's information can be immediately transmitted to the remote guardian's mobile terminal.

For this, in an embodiment of the present invention, a dangerous situation can be divided into a plurality of stages, and different information can be transmitted to the remote guardian's mobile terminal at each stage. For instance, if the band wearer's pulse rate exceeds a first pulse rate, a message indicating increase of the band wearer's pulse rate can be transmitted to the remote guardian's mobile terminal as shown in FIG. 12. If the band wearer's pulse rate exceeds a second pulse rate when the upper touch region 50a of the smart band is simultaneously touched with the side touch region 51a or 51b, the band wearer's information (sound, image and position information) may be transmitted to the remote guardian's mobile terminal together with pulse rate information (refer to FIGS. 9 to 11 and FIG. 12).

As another embodiment, if the band wearer's pulse rate exceeds a first pulse rate, the controller of the smart band can transmit a message indicating increase of the band wearer's pulse rate to the remote guardian's mobile terminal as shown in FIG. 12. If the band wearer's pulse rate exceeds the first pulse rate when the upper touch region 50a of the smart band is simultaneously touched with the side touch region 51a or 51b, the band wearer's information (sound, image and position information) can be transmitted to the remote guardian's mobile terminal together with pulse rate information (refer to FIGS. 9 to 11, and FIG. 12). Information to be transmitted according to an emergency situation may be preset through a menu. Especially, when the band wearer's pulse rate is higher than a reference value, the controller of the smart band can automatically report to an emergency center as well as the remote guardian.

As another embodiment, even if the upper touch region 50a of the smart band has not been simultaneously touched with the side touch region 51a or 51b, if a pressure more than a predetermine range is applied to the band wearer's wrist for a predetermined time, the controller of the smart band can recognize a current state as a dangerous state. Then, the controller of the smart band can inform the remote guardian's mobile terminal of the dangerous state. In this instance, the band wearer's peripheral image, peripheral sound and position information can be together transmitted. As still another embodiment, if the band wearer's drastic speed change or path deviation is sensed, the controller of the smart band can recognize a current state as a dangerous state, and inform the remote guardian's mobile terminal of the dangerous state.

Next, FIG. 13 is a view illustrating an embodiment to inform an emergency state by a smart band by using a speed and a path of a band wearer. As shown in FIG. 13, if the band wearer's drastic speed change or path deviation is sensed, the controller of the smart band can recognize a current state as a dangerous state, and inform the remote guardian's mobile terminal of the dangerous state. For notification of the dangerous state, the controller of the smart band compares a speed change degree or a path deviation degree, with first and second reference information. If the speed change degree or the path deviation degree exceeds the second reference information, the controller of the smart band transmits the band wearer's peripheral image, peripheral sound and position information (refer to FIGS. 9 to 11). Further, if the speed change degree or the path deviation degree exceeds the first reference information but does not exceed the second reference information, the controller of the smart band informs the dangerous state, and then transmits the band wearer's peripheral image, peripheral sound and position information according to a request of the remote guardian.

Figure 14:
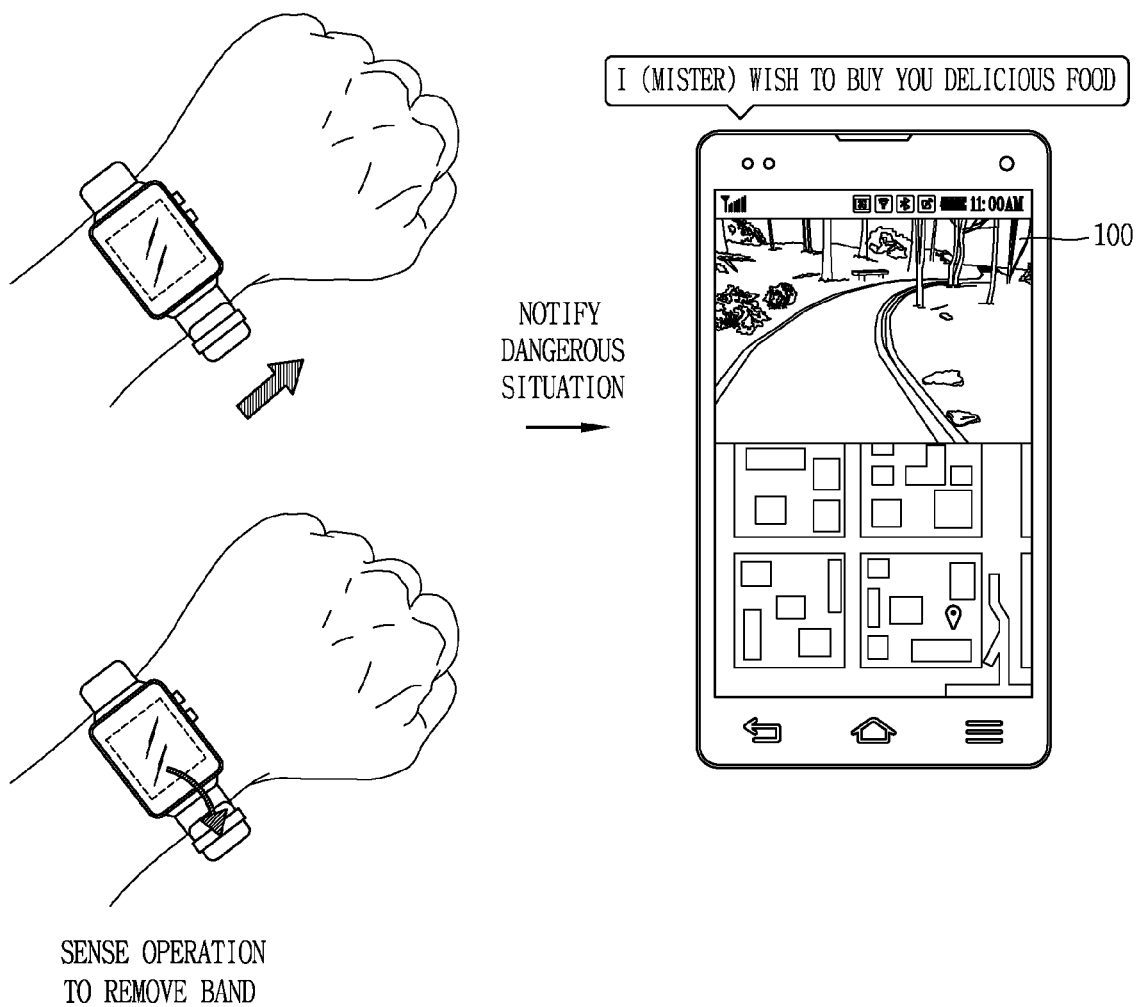
FIG. 14 is a view illustrating an embodiment to inform an emergency state by a smart band according to a locked state of a band.

FIG. 14 is a view illustrating an embodiment to inform an emergency state by a smart band according to a locked state of a band. The smart band according to an embodiment of the present invention is provided with a lock function so that it can be prevented from being intentionally removed by the band wearer or another person. For instance, when another person is about to remove the smart band by lifting an upper band of the smart band, the band is operated to be tightened.

As shown in FIG. 14, if another person is about to intentionally unwind the smart band from the band wearer's wrist, or if another person has completely unwound the smart band from the band wearer's wrist, the controller of the smart band can recognize a current state as a dangerous state, and inform the remote guardian's mobile terminal of the dangerous state. If another person is about to remove the smart band, the controller of the smart band merely informs the dangerous state. Further, if another person has completely removed the smart band, the controller of the smart band transmits the band wearer's peripheral image, peripheral sound and position information, to the remote guardian's mobile terminal.

Figure 15:
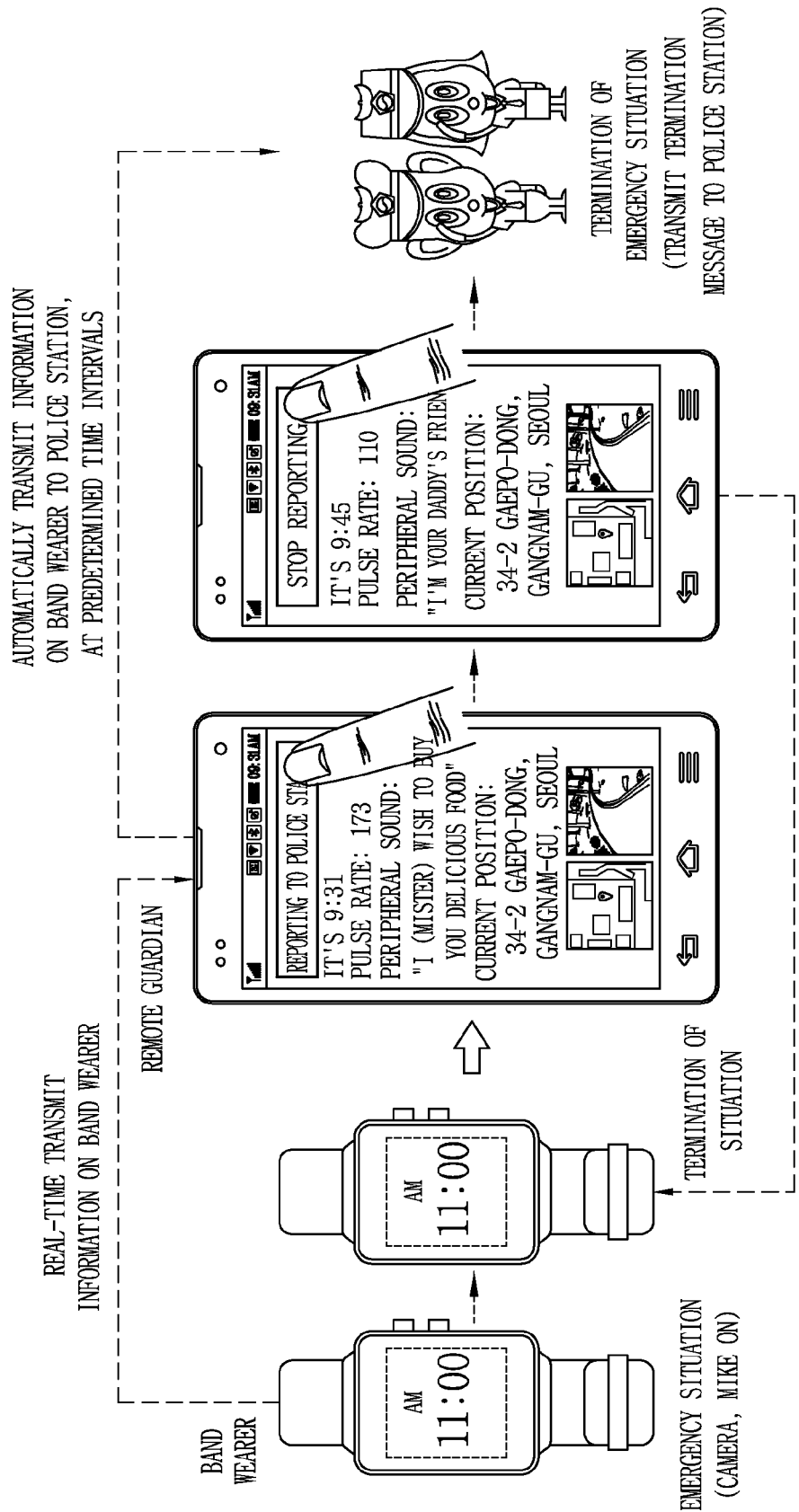
FIG. 15 is a view illustrating an entire operation of an emergency state monitoring method using a smart band according to a preferred embodiment of the present invention.

FIG. 15 is a view illustrating an entire operation of an emergency state monitoring method using a smart band according to a preferred embodiment of the present invention. As shown in FIG. 15, the controller of the smart band is converted into a standby state when the smart band is worn on a band wearer's wrist. Then, if the aforementioned various emergency situations (dangerous situations) occur on the band wearer, the controller of the smart band is converted into an emergency state, thereby performing an emergency call with a preset remote guardian. When an emergency situation occurs, the controller of the smart band can convert a current state into an urgent state, turn on a camera, a microphone, a GPS and various types of sensors, and display information indicating the urgent state on a screen of the body. The information may be displayed by changing a color of an icon or a screen into another color.

The controller of the smart band real-time transmits preset information to the remote guardian's mobile terminal, according to a type of a generated emergency state. As aforementioned, the type of the emergency state may include when touch inputs occur simultaneously on the upper touch region 50*a* and the side touch region 51*a* or 51*b* of the smart band, change of bio-information, a band wearer's speed change or path deviation, release of a locked-state of the smart band, etc.

At each emergency situation, the controller can compare input information with preset information, and determine information to be transmitted to the remote guardian's mobile terminal. For instance, if touch inputs occur simultaneously on the upper touch region 50*a* and the side touch region 51*a* or 51*b* of the smart band, the controller of the smart band can inform the remote guardian's mobile terminal of the touch inputs. If the touch inputs have been maintained for a predetermined time, or if a pressure within more than a predetermined range has occurred on the smart band, the controller of the smart band can transmit the band wearer's peripheral image, peripheral sound and position information, to the remote guardian's mobile terminal.

The band wearer's information transmitted real-time is displayed on the remote guardian's mobile terminal. The remote guardian can determine an emergency situation with viewing the band wearer's information being displayed on a screen of his or her mobile terminal. The remote guardian can determine a current state as a dangerous situation, if the band wearer has had a path deviation, a drastic impact (shock) or an increased pulse rate, or if the band wearer has fainted. Further, the remote guardian can recognize a peripheral situation as an emergency situation.

If it is determined that a current state is a dangerous situation, the remote guardian can select a 'police station report' menu provided at one side of the screen, thereby informing a police station that the band wearer is in a dangerous state. Once the 'police station report' menu is selected, the controller 180 of the remote guardian's mobile terminal periodically transmits the received band wearer's information to the police station. Especially, when the band wearer's pulse rate is higher than a reference value, the controller of the smart band may automatically report to an emergency center as well as the remote guardian.

Then, if a 'report stop' menu is selected as the band wearer has responded by touching emergency situation display information displayed on a screen, or as the band wearer's safety is checked, the controller 180 of the remote guardian's mobile terminal transmits an emergency situation termination message to the police station and the smart band. Once the emergency situation termination message is received from the remote guardian's mobile terminal, the controller of the smart band is converted into a standby state.

However, if the remote guardian does not wish to terminate the emergency situation after receiving the band wearer's termination request, the remote guardian can deny the request and may be continuously provided with related information. If a 'sending to a police station' menu is additionally selected, the remote guardian can be continuously provided with information without letting the band wearer be informed of current information in a visual manner on a display unit or in other manner.

As aforementioned, in an embodiment of the present invention, the smart band recognizes a band wearer's dangerous situation according to a touch type applied thereto, or according to bio-information and a movement type of a band wearer (e.g., child or old and weak person). Then, the smart band transmits information on the band wearer (e.g., peripheral sound, peripheral image and position information) to a mobile terminal of a remote guardian (e.g., parents). With such a configuration, the remote guardian can monitor safety of the band wearer (child or old and weak person) which is at a remote place, manually or automatically through the smart band.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A smart band, comprising:
a display unit provided at a body, and forming a first touch recognition region;
a wrist band connected to the body and having a second touch recognition region at one side of the band; and
a controller configured to:
sense a dangerous situation has occurred based on touch inputs on the first and second touch recognition regions, and
transmit preset information to a remote guardian's mobile terminal, in response to the dangerous situation being sensed.

2. The smart band of claim 1, wherein the controller is further configured to sense the dangerous situation in response to the first and second touch recognition regions being simultaneously touched and maintained for a predetermined time.

3. The smart band of claim 1, wherein the second touch recognition region is formed on two surfaces on opposite sides of the display unit or on a lower surface of the wrist band.

4. The smart band of claim 1, wherein the preset information includes at least one of a peripheral sound, a peripheral image, position information of the smart band, and bio-information of a user wearing the smart band.

5. The smart band of claim 1, wherein the controller is further configured to determine the preset information to be transmitted to the remote guardian's mobile terminal based on a type and a degree of the sensed dangerous situation.

6. The smart band of claim 5, wherein when the degree of the sensed dangerous situation is average, the controller is further configured to transmit the preset information indicating a current dangerous situation, and
wherein when the degree of the dangerous situation is greater than average, the controller is further configured to transmit the preset information including a peripheral sound, a peripheral image and position information of the smart band.

7. The smart band of claim 1, wherein the controller is further configured to transmit the preset information when a pressure having more than a predetermined range and strength is applied to the smart band.

8. The smart band of claim 1, wherein the controller is further configured to:
display information on the display unit indicating that an emergency connection is being made when the emergency situation is sensed, and
release the emergency connection in response to a predetermined input on the smart band or based on a termination signal transmitted by the remote guardian's mobile terminal.

9. The smart band of claim 8, wherein the controller is further configured to continuously transmit the preset information to the remote guardian's mobile terminal without displaying an emergency connection state on the display unit, when the remote guardian's mobile terminal requests information on a user and the emergency connection is released or terminated.

10. The smart band of claim 1, wherein the controller is further configured to connect to the remote guardian's mobile terminal in a standby state, in response to a request of the remote guardian or a user wearing the smart band, and to transmit the preset information to the remote guardian's mobile terminal.

11. A method of controlling a smart band, the method comprising:
sensing, via a controller of the mobile terminal, the smart band is being worn on a wrist of a user;
sensing, via the controller, a dangerous situation has occurred based on touch inputs on a first touch recognition formed on a display unit of the smart band and a second touch recognition region formed at one side of a wrist band of the smart band; and
transmitting, via the controller, preset information to a remote guardian's mobile terminal, in response to the dangerous situation being sensed.

12. The method of claim 11, wherein the sensing step senses the dangerous situation in response to the first and second touch recognition regions being simultaneously touched and maintained for a predetermined time.

13. The method of claim 11, wherein the second touch recognition region is formed on two surfaces on opposite sides of the display unit or on a lower surface of the wrist band.

14. The method of claim 11, wherein the preset information includes at least one of a peripheral sound, a peripheral image, position information of the smart band, and a bio-information of a user wearing the smart band.

15. The method of claim 11, further comprising:
determining the preset information to be transmitted to the remote guardian's mobile terminal based on a type and a degree of the sensed dangerous situation.

16. The smart band of claim 15, wherein when the degree of the sensed dangerous situation is average, the transmitting step transmits the preset information indicating a current dangerous situation, and
wherein when the degree of the dangerous situation is greater than average, the transmitting step transmits the preset information including a peripheral sound, a peripheral image and position information of the smart band.

17. The smart band of claim 11, wherein the transmitting step transmits the preset information when a pressure having more than a predetermined range and strength is applied to the smart band.

18. The smart band of claim 11, further comprising:
displaying information on the display unit indicating that an emergency connection is being made when the emergency situation is sensed; and
releasing the emergency connection in response to a predetermined input on the smart band or based on a termination signal transmitted by the remote guardian's mobile terminal.

19. The smart band of claim 18, wherein the transmitting step continuously transmits the preset information to the remote guardian's mobile terminal without displaying an emergency connection state on the display unit, when the remote guardian requests information on a user and the emergency connection is released or terminated.

20. The smart band of claim 11, further comprising:
connecting to the remote guardian's mobile terminal in a standby state, in response to a request of the remote guardian or a user wearing the smart band; and
transmitting the preset information to the remote guardian's mobile terminal.

* * * * *